(12) United States Patent
Lee (10) Patent No.: US 9,915,836 B2
(45) Date of Patent: Mar. 13, 2018

(54) LIQUID CRYSTAL DISPLAY

(71) Applicant: SAMSUNG DISPLAY CO., LTD., Yongin, Gyeonggi-Do (KR)

(72) Inventor: Yun Seok Lee, Chungcheongnam-do (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 220 days.

(21) Appl. No.: 14/748,511

(22) Filed: Jun. 24, 2015

(65) Prior Publication Data

US 2016/0202522 A1 Jul. 14, 2016

(30) Foreign Application Priority Data

Jan. 8, 2015 (KR) .................. 10-2015-0002975

(51) Int. Cl.
| | |
|---|---|
| G02F 1/1335 | (2006.01) |
| G02F 1/1343 | (2006.01) |
| G09G 3/36 | (2006.01) |
| G02F 1/1337 | (2006.01) |

(52) U.S. Cl.
CPC .. *G02F 1/133514* (2013.01); *G02F 1/133707* (2013.01); *G02F 1/134309* (2013.01); *G02F 2001/133757* (2013.01); *G02F 2001/134345* (2013.01); *G09G 3/3607* (2013.01); *G09G 3/3648* (2013.01); *G09G 2300/0452* (2013.01)

(58) Field of Classification Search
CPC ......... G02F 1/133514; G02F 1/133707; G02F 1/134309
USPC ....................................................... 349/106
See application file for complete search history.

(56) References Cited

U.S. PATENT DOCUMENTS

| | | | |
|---|---|---|---|
| 2003/0071943 A1* | 4/2003 | Choo ................ | G02F 1/133514 349/106 |
| 2005/0117092 A1* | 6/2005 | Park .................. | G02F 1/133514 349/106 |
| 2010/0045915 A1* | 2/2010 | No .................... | G02F 1/133514 349/138 |
| 2014/0118411 A1 | 5/2014 | Jang et al. | |
| 2016/0209701 A1* | 7/2016 | Qin .................. | G02F 1/133512 |

FOREIGN PATENT DOCUMENTS

| | | |
|---|---|---|
| JP | 2007206230 | 8/2007 |
| JP | 2013117674 | 6/2013 |
| KR | 1020110031010 | 3/2011 |
| KR | 1020110101894 | 9/2011 |

* cited by examiner

*Primary Examiner* — Lucy Chien
(74) *Attorney, Agent, or Firm* — F. Chau & Associates, LLC (57) ABSTRACT

An LCD including first to third pixel areas, each including first and second subpixel areas, the LCD including first and second substrates, first to third color filters on the first or second substrate, the first color filter in the first subpixel area of the first pixel area, the second color filter in the first subpixel area of the second pixel area, and the third color filter in the first subpixel area of the third pixel area, a white filter on the first or second substrate, the first color and white filter in the second subpixel area of the first pixel area, the second color and white filter in the second subpixel area of the second pixel area, and the third color and white filter in the second subpixel area of the third pixel area, the white filter surrounds the first, second and third color filters in the second subpixel area.

20 Claims, 9 Drawing Sheets

LIQUID CRYSTAL DISPLAY

CROSS-REFERENCE TO RELATED APPLICATION

This application claims priority under 35 U.S.C. § 119 to Korean Patent Application No. 10-2015-0002975 filed in the Korean Intellectual Property Office on Jan. 8, 2015, the disclosure of which is incorporated by reference herein in its entirety.

TECHNICAL FIELD

The present invention relates to a liquid crystal display.

DESCRIPTION OF THE RELATED ART

A liquid crystal display is one of the most widely used flat panel displays. The liquid crystal display includes a display panel on which an electric field generating electrode such as a pixel electrode is formed, another display panel on which a common electrode is formed, and a liquid crystal layer disposed between the two display panels. The liquid crystal display displays an image by applying a voltage to the electric field generating electrode to generate an electric field in the liquid crystal layer, the electric field determining an alignment of liquid crystal molecules in the liquid crystal layer and controlling polarization of incident light.

The liquid crystal display does not emit light by itself and thus requires a light source. The light source may emit white light. In this case, the light source may be a separate artificial light source or natural light. An example of the artificial light source used in the liquid crystal display may include a light emitting diode (LED), a cold cathode fluorescent lamp (CCFL), an external electrode fluorescent lamp (EEFL), or the like. The artificial light source may be positioned at a rear surface or lateral surface of the liquid crystal display and supplies light to the liquid crystal display.

In general, a color filter used for a liquid crystal display displays three colors such as red, green, and blue. While light supplied from the light source passes through the color filter, light of some wavelengths is absorbed into the color filter which causes some of the light to be lost. To compensate for lowered luminance, the liquid crystal display may further include a white pixel. However, a separate driving circuit is used for the white pixel.

SUMMARY

An exemplary embodiment of the present invention provides a liquid crystal display including a first color pixel area, a second color pixel area, and a third color pixel area, each of which includes a first subpixel area and a second subpixel area, the liquid crystal display including a first substrate and a second substrate that face each other, first, second, and third color filters positioned on the first substrate or the second substrate, the first color filter disposed in the first subpixel area of the first color pixel area, the second color filter disposed in the first subpixel area of the second color pixel area, and the third color filter disposed in the first subpixel area of the third color pixel area, first to third white filters positioned on the first substrate or the second substrate, another first color filter and the first white filter disposed in the second subpixel area of the first color pixel area, another second color filter and the second white filter disposed in the second subpixel area of the second color pixel area, and another third color filter and the third white filter disposed in the second subpixel area of the third color pixel area, and a liquid crystal layer positioned between the first substrate and the second substrate, wherein the first to third white filters surround the first color filter, the second color filter, and the third color filter in the second subpixel area.

The liquid crystal display may further include a pixel electrode positioned on the first substrate, wherein the pixel electrode includes a first subpixel electrode positioned in the first subpixel area, and a second subpixel electrode and a third subpixel electrode positioned in the second subpixel area.

The second subpixel electrode may overlap the first color filter, the second color filter, and the third color filter in the second subpixel area, and the third subpixel electrode may overlap the first to third white filters.

The second subpixel electrode and the third subpixel electrode of the first color pixel area and the second color pixel area may be separated from each other, and the second subpixel electrode and the third subpixel electrode of the third color pixel area may be connected to each other.

The second subpixel electrode may surround the third subpixel electrode in the first, second and third color pixel areas.

The third subpixel electrode of the first color pixel area, the third subpixel electrode of the second color pixel area, and the third subpixel electrode of the third color pixel area may be connected to each other.

The liquid crystal display may further include a first connection portion for connecting the third subpixel electrode of the first color pixel area to the third subpixel electrode of the second color pixel area.

The liquid crystal display may further include a second connection portion for connecting the third subpixel electrode of the second color pixel area to the third subpixel electrode of the third color pixel area.

Different data voltages may be applied to the first subpixel electrode and the second subpixel electrode.

The same data voltage may be applied to the third subpixel electrode of the first color pixel area, the third subpixel electrode of the second color pixel area, and the third subpixel electrode of the third color pixel area.

The first color may be red, the second color may be green, and the third color may be blue.

The first subpixel electrode and the second subpixel electrode may include a cross stem portion including a horizontal stem portion and a vertical stem portion that cross each other, and a plurality of branch portions that extend in a diagonal direction from the cross stem portion.

Each of the first subpixel electrode and the second subpixel electrode may include four domains separated by the cross stem portion.

The third subpixel electrode may surround the second subpixel electrode and may overlap the four domains.

The third subpixel electrode may include a plurality of branch portions.

The plurality of branch portions of the first, second or third subpixel electrodes may make an angle of 40 to 50 degrees with respect to the horizontal stem portion.

An exemplary embodiment of the present invention provides a liquid crystal display including: a first substrate and a second substrate facing the first substrate; a liquid crystal layer disposed between the first substrate and the second substrate; first subpixel electrodes disposed in first subpixel areas of first, second and third color pixel areas; and second and third subpixel electrodes disposed in second subpixel areas of the first, second and third color pixel areas, wherein the first subpixel area of a first color pixel area includes a first color filter, the first subpixel area of a second color pixel area includes a second color filter, and the first subpixel area of a third color pixel area includes a third color filter, wherein the second subpixel area of the first color pixel area includes a first color filter and a white filter, the second subpixel area of the second color pixel area includes a second color filter and a white filter, and the second subpixel area of the third color pixel area includes a third color filter and a white filter, wherein the second and third subpixel electrodes are separated from each other in the first color pixel area, the second and third subpixel electrodes are separated from each other in the second color pixel area and the second and third subpixel electrodes are connected to each other in the third color pixel area.

The white filter may be disposed on opposite sides of the first color filter in the second subpixel area of the first color pixel area, the white filter may be disposed on opposite sides of the second color filter in the second subpixel area of the second color pixel area and the white filter may be disposed on opposite sides of the third color filter in the second subpixel area of the third color pixel area.

The first color may be red, the second color may be green, and the third color may be blue.

An exemplary embodiment of the present invention provides a liquid crystal display including: a first substrate and a second substrate facing the first substrate; a liquid crystal layer disposed between the first substrate and the second substrate; first subpixel electrodes disposed in first subpixel areas of first, second and third color pixel areas; and second and third subpixel electrodes disposed in second subpixel areas of the first, second and third color pixel areas, wherein the first subpixel area of a first color pixel area includes a first color filter, the first subpixel area of a second color pixel area includes a second color filter, and the first subpixel area of a third color pixel area includes a third color filter, wherein the second subpixel area of the first color pixel area includes a first color filter and a white filter, the second subpixel area of the second color pixel area includes a second color filter and a white filter, and the second subpixel area of the third color pixel area includes a third color filter and a white filter, wherein the second subpixel electrode of the first color pixel area is connected to a first data line via a first transistor, the second subpixel electrode of the second color pixel area is connected to a second data line via a second transistor and the third subpixel electrode of the third color pixel area is connected to a third data line via a third transistor.

DETAILED DESCRIPTION OF THE EMBODIMENTS

Hereinafter, exemplary embodiments of the present invention will be described more fully with reference to the accompanying drawings. However, the described embodiments may be modified in various different ways, and should not be construed as limited to the embodiments disclosed herein.

In the drawings, the thickness of layers, films, panels, regions, etc., may be exaggerated for clarity. Like reference numerals may designate like elements throughout the specification. It will be understood that when an element such as a layer, film, region, or substrate is referred to as being "on" another element, it can be directly on the other element or intervening elements may also be present.

First, with reference to FIGS. 1 to 3, a liquid crystal display according to an exemplary embodiment of the present invention will be described.

Figure 1:
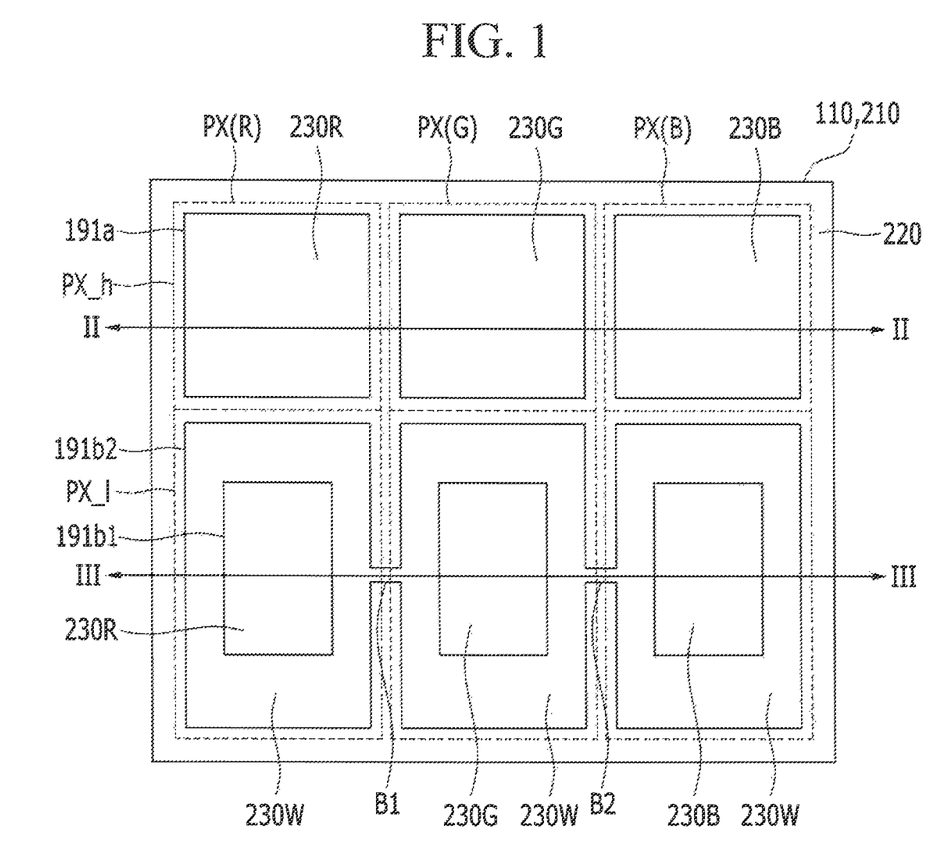
FIG. 1 is a top plan view of a liquid crystal display according to an exemplary embodiment of the present invention.
Figure 2:
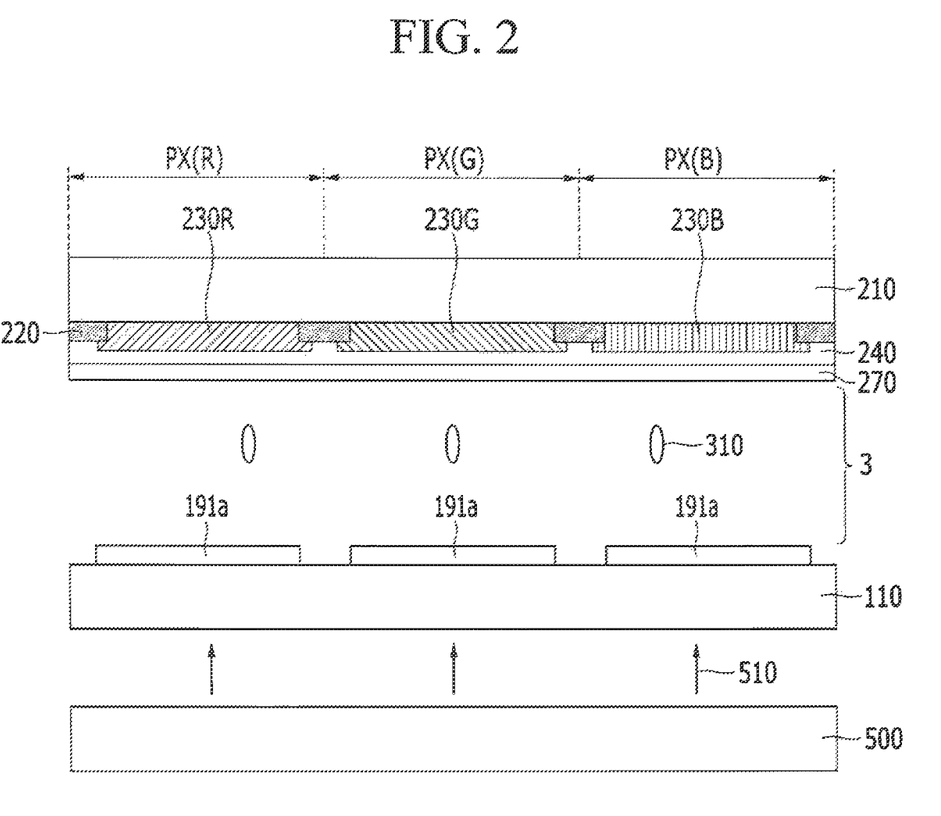
FIG. 2 is a cross-sectional view of a liquid crystal display taken along line II-II of FIG. 1 according to an exemplary embodiment of the present invention.
Figure 3:
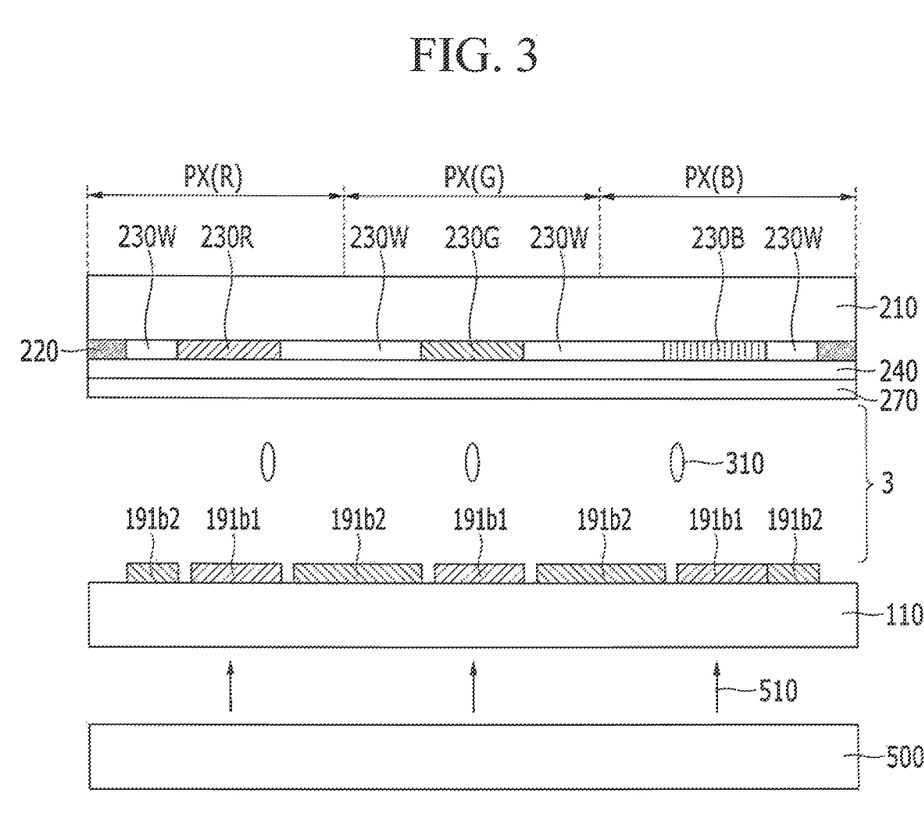
FIG. 3 is a cross-sectional view of a liquid crystal display taken along line III-III of FIG. 1 according to an exemplary embodiment of the present invention.

FIG. 1 is a top plan view of a liquid crystal display according to an exemplary embodiment of the present invention, FIG. 2 is a cross-sectional view of a liquid crystal display taken along line II-II of FIG. 1 according to an exemplary embodiment of the present invention, and FIG. 3 is a cross-sectional view of a liquid crystal display taken along line III-III of FIG. 1 according to an exemplary embodiment of the present invention.

First, referring to FIG. 1, the liquid crystal display according to an exemplary embodiment of the present invention may include a plurality of pixel areas PX(R), PX(G), and PX(B) and the plurality of pixel areas may include a first color pixel area PX(R), a second color pixel area PX(G), and a third color pixel area PX(B).

The first color pixel area PX(R), the second color pixel area PX(G), and the third color pixel area PX(B) may display different colors from each other and display white by combining the different colors. For example, the first color pixel area PX(R) may display red, the second color pixel area PX(G) may display green, and the third color pixel area PX(B) may display blue.

In addition, the present invention is not limited to these colors. In other words, the first color pixel area PX(R) may display cyan, the second color pixel area PX(G) may display magenta, and the third color pixel area PX(B) may display yellow.

In addition, each pixel area may include a first subpixel area PX_h and a second subpixel area PX_1.

A red filter 230R may be disposed in the first subpixel area PX_h of the first color pixel area PX(R), a green filter 230G may be disposed in the first subpixel area PX_h of the second color pixel area PX(G), and a blue filter 230B may be disposed in the first subpixel area PX_h of the third color pixel area PX(B).

In addition, the red filter 230R and a white filter 230W may be disposed in the second subpixel area PX_1 of the first color pixel area PX(R), the green filter 230G and the white filter 230W may be disposed in the second subpixel area PX_1 of the second color pixel area PX(G), and the blue filter 230B and the white filter 230W may be disposed in the second subpixel area PX_1 of the third color pixel area PX(B).

In this case, the white filter 230W surrounds each of the red filter 230R, the green filter 230G, and the blue filter 230B in the second subpixel area PX_1 of each color pixel area. The red filter 230R, green filter 230G, blue filter 230B and white filter 230W are color filters.

In addition, a first subpixel electrode 191a is positioned in the first subpixel area PX_h, and a second subpixel electrode 191b1 and a third subpixel electrode 191b2 are positioned in the second subpixel area PX_1.

Particularly, the second subpixel electrode 191b1 may be positioned to overlap each of the color filters 230R, 230G, and 230B of the second subpixel area PX_1, and the third subpixel electrode 191b2 may be positioned to overlap the white filter 230W of the second subpixel area PX_1.

In other words, in the second subpixel area PX_1, the third subpixel electrode 191b2 surrounds the second subpixel electrode 191b1, and the third subpixel electrodes 191b2 of respective pixel areas are connected to each other.

For example, the third subpixel electrode 191b2 is separated from the second subpixel electrode 191b1 while surrounding the second subpixel electrode 191b1 in the second subpixel area PX_1 of the first color pixel area PX(R), the third subpixel electrode 191b2 is separated from the second subpixel electrode 191b1 while surrounding the second subpixel electrode 191b1 in the second subpixel area PX_1 of the second color pixel area PX(G), and the third subpixel electrode 191b2 is connected to the second subpixel electrode 191b1 while surrounding the second subpixel electrode 191b1 in the second subpixel area PX_1 of the third color pixel area PX(B).

In addition, the third subpixel electrode 191b2 of the first color pixel area PX(R) may be connected to the third subpixel electrode 191b2 of the second color pixel area PX(G) through a first connection portion B1, and the third subpixel electrode 191b2 of the second color pixel area PX(G) may be connected to the third subpixel electrode 191b2 of the third color pixel area PX(B) through a second connection portion B2.

The third subpixel electrodes 191b2 that overlap white filters 230W of the first color pixel area PX(R), the second color pixel area PX(G), and the third color pixel area PX(B) may be connected to each other and the second subpixel electrode 191b1 and the third subpixel electrode 191b2 of the third color pixel area PX(B) may be connected to simplify a driving circuit for a white pixel.

In other words, according to an exemplary embodiment of the present invention, one pixel area may include the first subpixel area PX_h and the second subpixel area PX_1 and the second subpixel area PX_1 may include a region for displaying white to simplify a driving circuit and to reduce manufacturing costs compared with the case in which a separate white pixel is formed.

Referring to FIGS. 2 and 3, the liquid crystal display according to an exemplary embodiment of the present invention includes a first substrate 110 and a second substrate 210 that face each other, and a liquid crystal layer 3 positioned between the first substrate 110 and the second substrate 210.

The first substrate 110 and the second substrate 210 may be formed of glass or plastic. The liquid crystal layer 3 may include a plurality of liquid crystal molecules 310 and may be of a positive or negative type.

A light source 500 may be disposed at a rear surface of the first substrate 110. The light source 500 may include a light emitting diode (LED) and light 510 may be supplied from the light source 500. A direction of the liquid crystal molecules 310 of the liquid crystal layer 3 may be determined according to an electric field formed between the first substrate 110 and the second substrate 210, and the amount of light passing through the liquid crystal layer 3 may be varied according to a direction (e.g., orientation) of the liquid crystal molecule 310. The plurality of color filters 230R, 230G, and 230B are positioned on the second substrate 210. While light passing through the liquid crystal layer 3 passes through the color filters 230R, 230G, 230B, and 230W, light of some wavelengths passes through the color filters 230R, 230G, 230B, and 230W and light of other wavelengths is absorbed into the color filters 230R, 230G, 230B, and 230W. In other words, a certain amount of light is lost.

A pixel electrode 191 may be positioned on the first substrate 110.

The pixel electrode 191 may include the first sub pixel electrode 191a positioned in the first subpixel area PX_h, and the second sub pixel electrode 191b1 and the third sub pixel electrode 191b2 positioned in the second subpixel area PX_1.

On the second substrate 210 facing the first substrate 110, a color filter 230 is disposed to overlap the first sub pixel electrode 191a and the second sub pixel electrode 191b1 and the white filter 230W is disposed to overlap the third sub pixel electrode 191b2.

The first color filter 230R is positioned in the first subpixel area PX_h of the first color pixel area PX(R), the second color filter 230G is positioned in the first subpixel area PX_h of the second color pixel area PX(G), and the third color filter 230B is positioned in the first subpixel area PX_h of the third color pixel area PX(B).

In the second subpixel area PX_of the first color pixel area PX(R), the first color filter 230R is positioned to overlap the second sub pixel electrode 191b1, and the white filter 230W is positioned to overlap the third sub pixel electrode 191b2.

In the second subpixel area PX_1 of the second color pixel area PX(G), the second color filter 230G is positioned to overlap the second sub pixel electrode 191b1, and the white filter 230W is positioned to overlap the third sub pixel electrode 191b2.

In the second subpixel area PX_1 of the third color pixel area PX(B), the third color filter 230B is positioned to overlap the second sub pixel electrode 191b1, and the white filter 230W is positioned to overlap the third sub pixel electrode 191b2.

The first color filter 230R may include a red filter passing only red light as white light passes the first color filter 230R. The second color filter 230G may include a green filter passing only green light as white light passes the second color filter 230G. The third color filter 230B may include a blue filter passing only blue light as white light passes the third color filter 230B. White light may pass through the white filter 230W without change.

FIGS. 2 and 3 show the case in which the first color filter 230R, the second color filter 230G, the third color filter 230B, and the white filter 230W are disposed on the second substrate 210, but the present invention is not limited thereto. For example, the first color filter 230R, the second color filter 230G, the third color filter 230B, and the white filter 230W may be disposed on the first substrate 110.

A light blocking member 220 may be disposed at boundaries of the first color pixel area PX(R), the second color pixel area PX(G), and the third color pixel area PX(B).

The light blocking member 220 may prevent color blending and light leakage at a boundary of each pixel area.

An overcoat 240 may be further positioned on the first color filter 230R, the second color filter 230G, the third color filter 230B, the white filter 230W, and the light blocking member 220.

The overcoat 240 may planarize an upper surface of the second substrate 210. The second substrate 210 may be planarized by the overcoat 240 to maintain a constant distance between the first substrate 110 and the second substrate 210. In other words, a liquid crystal display according to an exemplary embodiment of the present invention may have a constant cell gap (CG).

A common electrode 270 is formed on the overcoat 240.

The common electrode 270 may be formed of a transparent metal oxide such as indium tin oxide (ITO) and indium zinc oxide (IZO).

A constant voltage such as a command voltage is applied to the common electrode 270. When a data voltage is applied to the pixel electrode 191, an electric field is formed between the pixel electrode 191 and the common electrode 270, and the liquid crystal molecules 310 of the liquid crystal layer 3 positioned between the pixel electrode 191 and the common electrode 270 are aligned in a predetermined direction.

With reference to FIGS. 4 to 8 together with FIGS. 1 to 3, a liquid crystal display according to an exemplary embodiment of the present invention will be further described.

Figure 4:
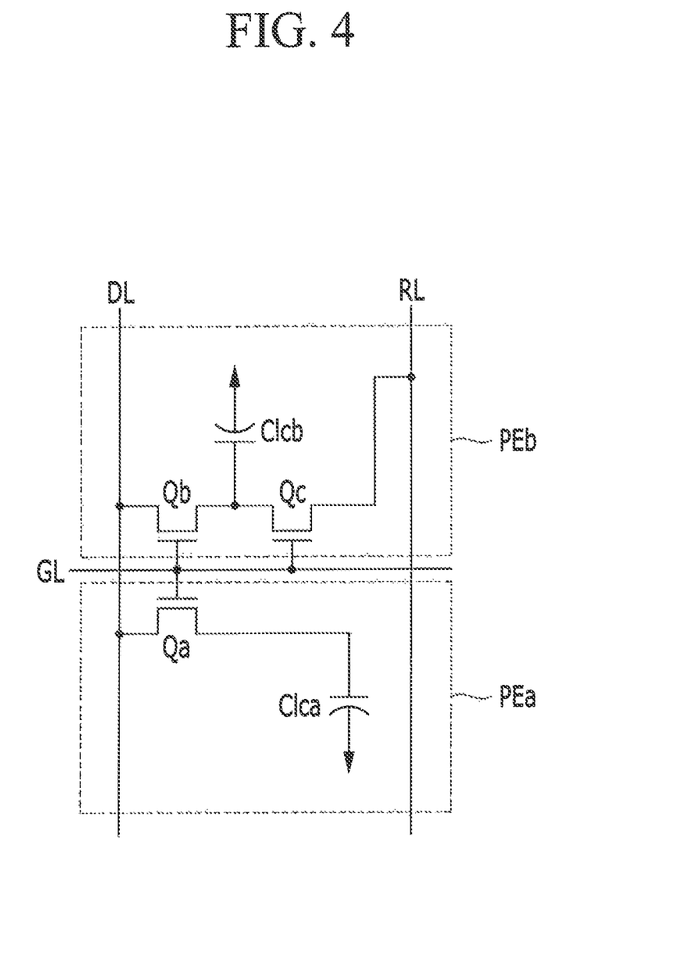
FIG. 4 is an equivalent circuit diagram of a pixel of a liquid crystal display according to an exemplary embodiment of the present invention.
Figure 5:
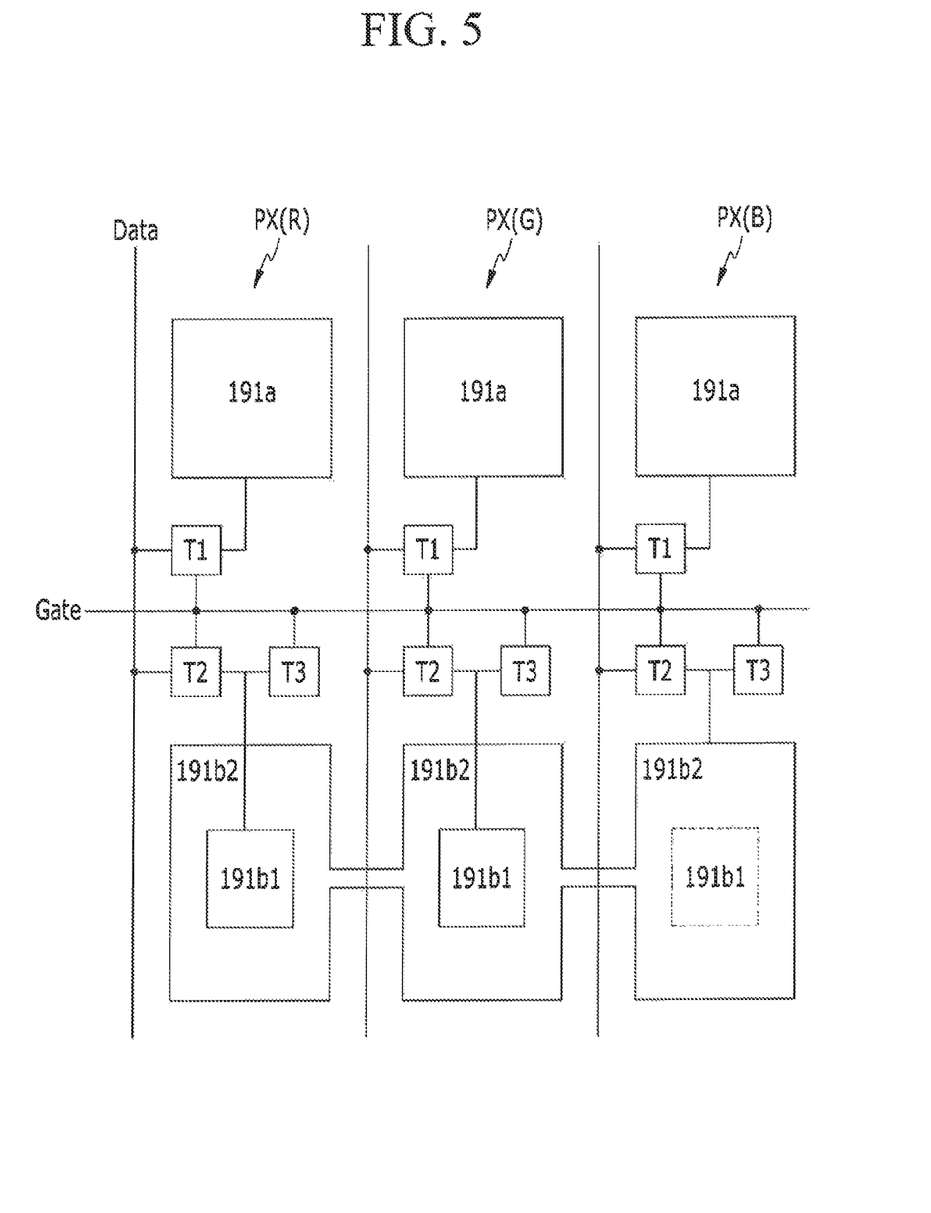
FIGS. 5 and 6 are pixel layout views of a liquid crystal display according to an exemplary embodiment of the present invention.
Figure 6:
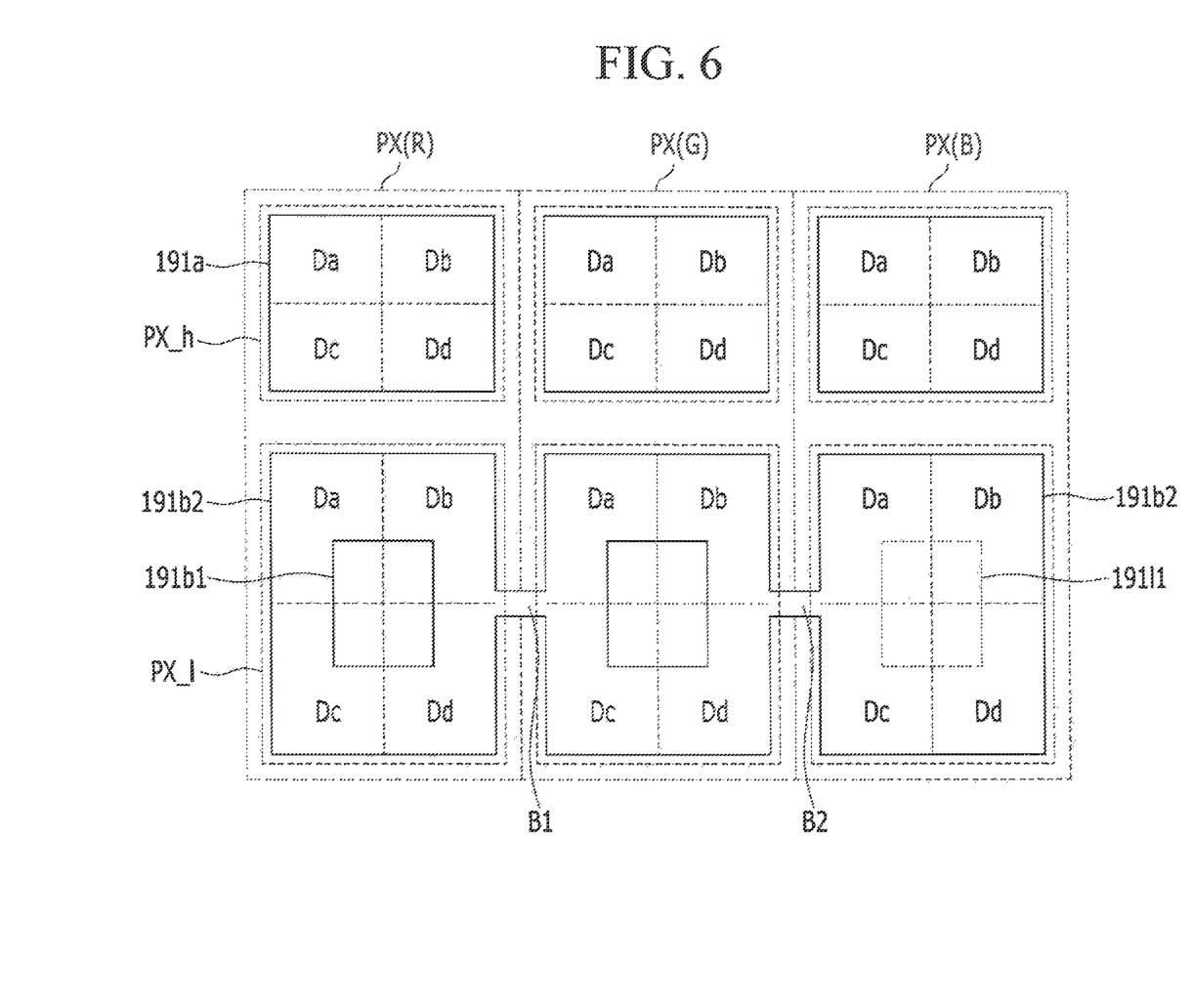
Figure 7:
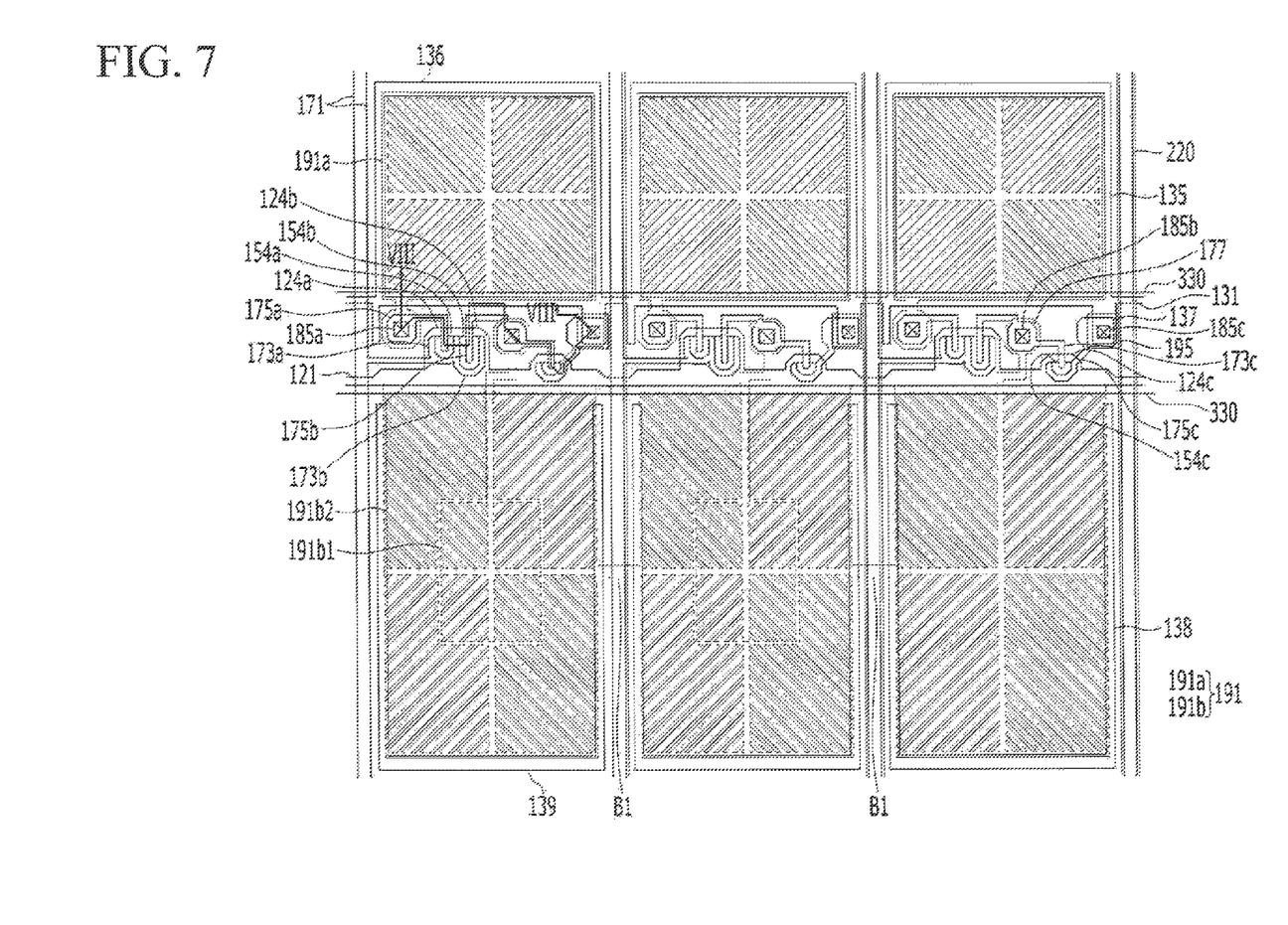
FIG. 7 is a top plan view of a liquid crystal display according to an exemplary embodiment of the present invention.
Figure 8:
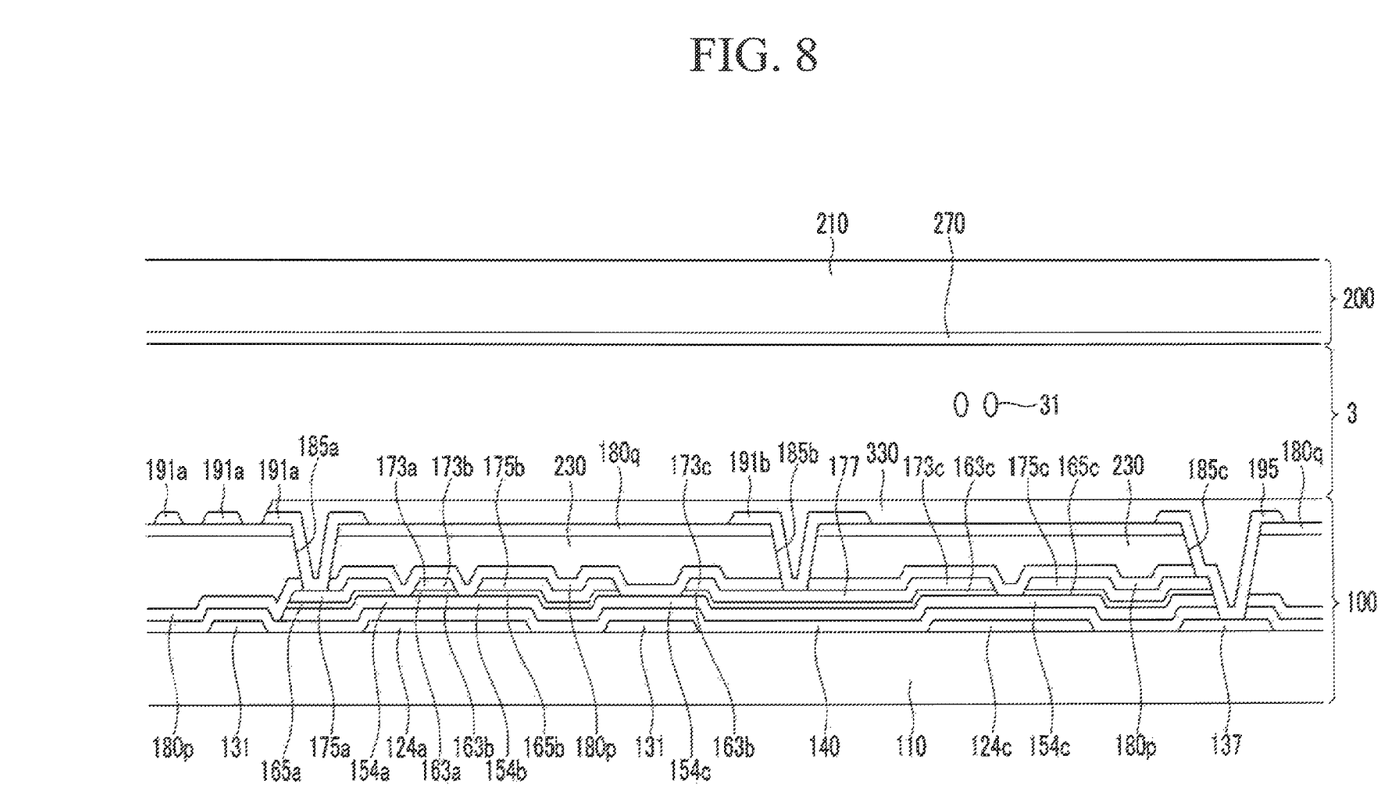
FIG. 8 is a cross-sectional view of a liquid crystal display taken along line VIII-VIII of FIG. 7 according to an exemplary embodiment of the present invention.

FIG. 4 is an equivalent circuit diagram of a pixel of a liquid crystal display according to an exemplary embodiment of the present invention, FIGS. 5 and 6 are pixel layout views of a liquid crystal display according to an exemplary embodiment of the present invention, FIG. 7 is a top plan view of a liquid crystal display according to an exemplary embodiment of the present invention, and FIG. 8 is a cross-sectional view of a liquid crystal display taken along line VIII-VIII of FIG. 7 according to an exemplary embodiment of the present invention.

Referring to FIG. 4, a pixel PX of the liquid crystal display according to an exemplary embodiment of the present invention includes a plurality of signal lines including a gate line GL for transmitting a gate signal, a data line DL for transmitting a data signal, a division reference voltage line RL for transmitting a division reference voltage, first, second, and third switching elements Qa, Qb, and Qc connected to the plurality of signal lines, and first and second liquid crystal capacitors Clca and Clcb.

The first and second switching elements Qa and Qb are connected to the gate line GL and the data line DL, respectively, and the third switching element Qc is connected to an output terminal of the second switching element Qb and the division reference voltage line RL.

The first switching element Qa and the second switching element Qb are each a three-terminal element such as a thin film transistor, a control terminal of each of the first switching element Qa and the second switching element Qb is connected to the gate line GL, an input terminal of each of the first switching element Qa and the second switching element Qb is connected to the data line DL, an output terminal of the first switching element Qa is connected to the first liquid crystal capacitor Clca, and an output terminal of the second switching element Qb is connected to an input terminal of each of the second liquid crystal capacitor Clcb and the third switching element Qc.

The third switching element Qc is also a three-terminal element such as a thin film transistor, a control terminal of the third switching element Qc is connected to the gate line GL, an input terminal of the third switching element Qc is connected to the output terminal of the second liquid crystal capacitor Clcb, and an output terminal of the third switching element Qc is connected to the division reference voltage line RL.

When a gate-on signal is applied to the gate line GL, the first switching element Qa, the second switching element Qb, and the third switching element Qc that are connected to the gate line GL are turned on. Accordingly, a data voltage applied to the data line DL is applied to a first subpixel electrode PEa and a second subpixel electrode PEb through the first switching element Qa and the second switching element Qb that are turned on. In this case, the data voltages applied to the first subpixel electrode PEa and the second subpixel electrode PEb are the same, and the first liquid crystal capacitor Clca and the second liquid crystal capacitor Clcb are charged with the same value corresponding to a difference between a common voltage and a data voltage. Simultaneously, a voltage charged in the second liquid crystal capacitor Clcb is divided through the third switching element Qc that is turned on. Accordingly, a voltage charged in the second liquid crystal capacitor Clcb is lowered by a difference between a common voltage and a division reference voltage. In other words, a voltage charged in the first liquid crystal capacitor Clca is higher than the voltage charged in the second liquid crystal capacitor Clcb.

As such, the voltage charged in the first liquid crystal capacitor Clca and the voltage charged in the second liquid crystal capacitor Clcb are different from each other. Since the voltage of the first liquid crystal capacitor Clca and the voltage of the second liquid crystal capacitor Clcb are different, inclination angles of liquid crystal molecules in a first subpixel and a second subpixel are different, and thus luminances in the two subpixels are different. Accordingly, when the voltage of the first liquid crystal capacitor Clca and the voltage of the second liquid crystal capacitor Clcb are appropriately adjusted, an image viewed from the side (of a liquid crystal display) and an image viewed from the front (of a liquid crystal display) may be similar, thereby improving side visibility.

According to the exemplary embodiment of the present invention illustrated in FIG. 4, to differentiate the voltage charged in the first liquid crystal capacitor Clca and the voltage charged in the second liquid crystal capacitor Clcb, the third switching element Qc connected to the second liquid crystal capacitor Clcb and the division reference voltage line RL is used. However, in a liquid crystal display according to an exemplary embodiment of the present invention, the second liquid crystal capacitor Clcb may be used with a step-down capacitor. For example, the liquid crystal display may include a third switching element including a first terminal connected to a step-down gate line, a second terminal connected to the second liquid crystal capacitor Clcb, and a third terminal connected to the step-down capacitor to charge the step-down capacitor with some of the electric charges charged in the second liquid crystal capacitor Clcb such that charged voltages between the first liquid crystal capacitor Clca and the second liquid crystal capacitor Clcb are set to be different. In addition, in a liquid crystal display according to an exemplary embodiment of the present invention, the first liquid crystal capacitor Clca and the second liquid crystal capacitor Clcb may be connected to different data lines so that they receive different data voltages such that charged voltages between the first liquid crystal capacitor Clca and the second liquid crystal capacitor Clcb are set to be different. In addition, according to various methods, charged voltages between the first liquid crystal capacitor Clca and the second liquid crystal capacitor Clcb may be set to be different.

Referring FIGS. 5 and 6, in the case of a first color pixel, a second color pixel, and a third color pixel, the first sub pixel electrode 191a is disposed above a gate line Gate and the second sub pixel electrode 191b1 and the third sub pixel electrode 191b2 are disposed below the gate line Gate.

Three thin film transistors T1, T2, and T3 are also distributed and disposed above and below the gate line Gate.

The second thin film transistor T2 and the third thin film transistor T3 of the first color pixel area PX(R) and the second color pixel area PX(G) may be connected to the second sub pixel electrode 191b1, and the second thin film transistor T2 and the third thin film transistor T3 of the third color pixel area PX(B) may be connected to the third sub pixel electrode 191b2.

In other words, the second sub pixel electrode 191b1 of the first color pixel area PX(R), the second sub pixel electrode 191b1 of the second color pixel area PX(G), and the third sub pixel electrode 191b2 of the third color pixel area PX(B) may be connected to a respective data line to receive the same data voltage.

As shown in FIG. 6, the first sub pixel electrode 191a, the second sub pixel electrode 191b1, and the third sub pixel electrode 191b2 are divided into four subregions Da, Db, Dc, and Dd by a horizontal line and a vertical line that cross each other.

Referring to FIGS. 7 and 8, a liquid crystal display according to an exemplary embodiment of the present invention includes a lower display panel 100 and an upper display panel 200 that face each other, the liquid crystal layer 3 between the two display panels 100 and 200, and a pair of polarizers attached to external surfaces of the display panels 100 and 200.

First, the lower display panel 100 will be described below.

A gate conductor including a gate line 121 and a division reference voltage line 131 is formed on the first substrate 110 formed of transparent glass or plastic.

The gate line 121 includes a wide end portion for connection with a first gate electrode 124a, a second gate electrode 124b, a third gate electrode 124c and other layers or an external driving circuit.

The division reference voltage line 131 includes first storage electrodes 135 and 136 and a reference electrode 137. Second storage electrodes 138 and 139 are positioned to overlap a second sub pixel electrode 191b and are not connected to the division reference voltage line 131.

A gate insulating layer 140 is formed on the gate line 121 and the division reference voltage line 131.

A first semiconductor 154a, a second semiconductor 154b, and a third semiconductor 154c are formed on the gate insulating layer 140.

A plurality of ohmic contacts 163a, 165a, 163b, 165b, 163c, and 165c are formed on the semiconductors 154a, 154b, and 154c.

A data conductor including a plurality of data lines 171 including a first source electrode 173a and a second source electrode 173b, a first drain electrode 175a, a second drain electrode 175b, a third source electrode 173c, and a third drain electrode 175c is formed on the ohmic contacts 163a, 165a, 163b, 165b, 163c, and 165c and the gate insulating layer 140.

The data conductor and the semiconductors and ohmic contacts positioned therebelow may be simultaneously formed using one mask.

The data line 171 includes a wide end portion for connection with other layers or an external driving circuit.

The first gate electrode 124a, the first source electrode 173a, and the first drain electrode 175a constitute one first thin film transistor (TFT) Qa together with the first island-type semiconductor 154a, and a channel of the thin film transistor is formed on a semiconductor between the first source electrode 173a and the first drain electrode 175a. The second gate electrode 124b, second source electrode 173b, and second drain electrode 175b constitute one second TFT Qb together with the second island-type semiconductor 154b, and a channel is formed on the semiconductor 154b between the second source electrode 173b and the second drain electrode 175b. The third gate electrode 124c, a third source electrode 173c, and the third drain electrode 175c constitute one third TFT Qc together with the third island-type semiconductor 154c, and a channel is formed on the semiconductor 154c between the third source electrode 173c and the third drain electrode 175c.

The second drain electrode 175b is connected to the third source electrode 173c and includes a wide extension portion 177.

A first passivation layer 180p is further formed on the data conductors 171, 173c, 175a, 175b, and 175c and an exposed portion of the semiconductors 154a, 154b, and 154c. The first passivation layer 180p may include an inorganic insulating layer such as silicon nitride or silicon oxide. The first passivation layer 180p may prevent pigment of the color filter 230 from being introduced into exposed portions of the semiconductors 154a, 154b, and 154c.

The color filter 230 is formed on the first passivation layer 180p. The color filter 230 extends in a vertical direction along two adjacent data lines 171. The first light blocking member 220 is positioned on the first passivation layer 180p, an edge of the color filter 230, and the data line 171.

The first light blocking member 220 extends along the data line 171 and is positioned between two neighboring color filters 230. A width of the first light blocking member 220 may be wider than a width of the data line 171. As such, when the width of the first light blocking member 220 is wider than the width of the data line 171, the first light blocking member 220 prevents light emitted from an external source from being reflected off a surface of the data line 171, formed of metal. Accordingly, light reflected off the surface of the data line 171 may interfere with light passing through the liquid crystal layer 3, thereby preventing a contrast ratio of a liquid crystal display from being degraded.

A second passivation layer 180q is formed on the color filter 230 and the first light blocking member 220.

The second passivation layer 180q may include an inorganic insulating layer such as silicon nitride or silicon oxide. The second passivation layer 180q may prevent the color filter 230 from being lifted up and prevent the liquid crystal layer 3 from being contaminated due to an organic material such as a solvent introduced from the color filter 230, thereby preventing errors such an afterimage that may be caused during screen driving.

A first contact hole 185a and a second contact hole 185b through which the first drain electrode 175a and the second drain electrode 175b are exposed are formed in the first passivation layer 180p and the second passivation layer 180q.

A third contact hole 185c through which a portion of the reference electrode 137 and a portion of the third drain electrode 175c are exposed is formed in the first passivation layer 180p, the second passivation layer 180q, and the gate insulating layer 140, and a connection member 195 covers the third contact hole 185c. The connecting member 195 electrically connects the reference electrode 137 and the third drain electrode 175c that are exposed through the third contact hole 185c.

The plurality of pixel electrodes 191 are formed on the second passivation layer 180q. The pixel electrodes 191 are separated from each other across the gate line 121 therebetween and include the first sub pixel electrode 191a and the second sub pixel electrode 191b that are neighbored in a column direction with respect to the gate line 121. The pixel electrode 191 may be formed of a transparent material such as ITO and IZO. The pixel electrode 191 may be formed of a transparent conductive material such as ITO or IZO or a reflective metal such as aluminum, silver, chromium or an alloy thereof.

Each of the first sub pixel electrode 191a and the second sub pixel electrode 191b includes one or more electrodes 191 or modifications thereof as illustrated and described with reference to FIG. 4.

The first sub pixel electrode 191a and the second sub pixel electrode 191b are physically and electrically connected to the first drain electrode 175a and the second drain electrode 175b through the first contact hole 185a and the second contact hole 185b, respectively, and receive a data voltage from the first drain electrode 175a and the second drain electrode 175b. In this case, a portion of the data voltage applied to the second drain electrode 175b is divided through the third source electrode 173c, and an amplitude of a voltage applied to the first sub pixel electrode 191a is higher than an amplitude of a voltage applied to the second sub pixel electrode 191b.

The first sub pixel electrode 191a and the second sub pixel electrode 191b to which the data voltage is applied may generate an electric field together with the common electrode 270 of the upper display panel 200 to determine a direction of liquid crystal molecules 31 of the liquid crystal layer 3 between the two electrodes 191 and 270. According to the determined direction of liquid crystal molecules, luminance of light passing through the liquid crystal layer 3 is changed.

A second light blocking member 330 is positioned on the pixel electrode 191. The second light blocking member 330 is formed to cover a region in which the first transistor Qa, the second transistor Qb, the third transistor Qc and the first to third contact holes 185a, 185b, and 185c are positioned and extends in the same direction as the gate line 121 to overlap a portion of the data line 171. The second light blocking member 330 may be positioned to overlap at least portions of the two data lines 171 positioned next to opposite sides of one pixel area to prevent light leakage that may occur around the data line 171 and the gate line 121 and to prevent light leakage in a region in which the first transistor Qa, the second transistor Qb, and the third transistor Qc are positioned.

Before the second light blocking member 330 is formed, the first passivation layer 180p, the color filter 230, and the second passivation layer 180q may be positioned in a region in which the first transistor Qa, the second transistor Qb, the third transistor Qc, and the first to third contact holes 185a, 185b, and 185c are positioned to easily distinguish positions of the first transistor Qa, the second transistor Qb, the third transistor Qc, and the first to third contact holes 185a, 185b, and 185c.

Hereinafter, the upper display panel 200 will be described.

The common electrode 270 is formed on the second substrate 210.

An upper alignment layer is formed on the common electrode 270. The upper alignment layer may be a vertical alignment layer or an alignment layer that is photo aligned using a photopolymerization material.

A polarizer may be disposed on an external surface of each of the two display panels 100 and 200, transmissive axes of two polarizers may be perpendicular to each other, and one of the transmissive axes may be parallel to the gate line 121. However, the polarizer may be disposed only on an external surface of the display panels 100 and 200.

The liquid crystal layer 3 has negative dielectric anisotropy and a major axis of the liquid crystal molecules 31 of the liquid crystal layer 3 may be aligned to be perpendicular to surfaces of the two display panels 100 and 200 in a state in which an electric field is not present. Accordingly, incident light does not pass through a crossed polarizer and is blocked in a state in which an electric field is not present.

As described above, the first sub pixel electrode 191a and the second sub pixel electrode 191b to which a data voltage is applied generate an electric field together with the common electrode 270 of the upper display panel 200 such that the liquid crystal molecules 31 of the liquid crystal layer 3, which are aligned to be perpendicular to the surfaces of the two electrodes 191 and 270 in a state in which an electric field is not present, lie in a direction parallel to the surfaces of the two electrodes 191 and 270 and luminance of light passing through the liquid crystal layer 3 is changed according to a lying degree of the liquid crystal molecules 31.

Figure 9:
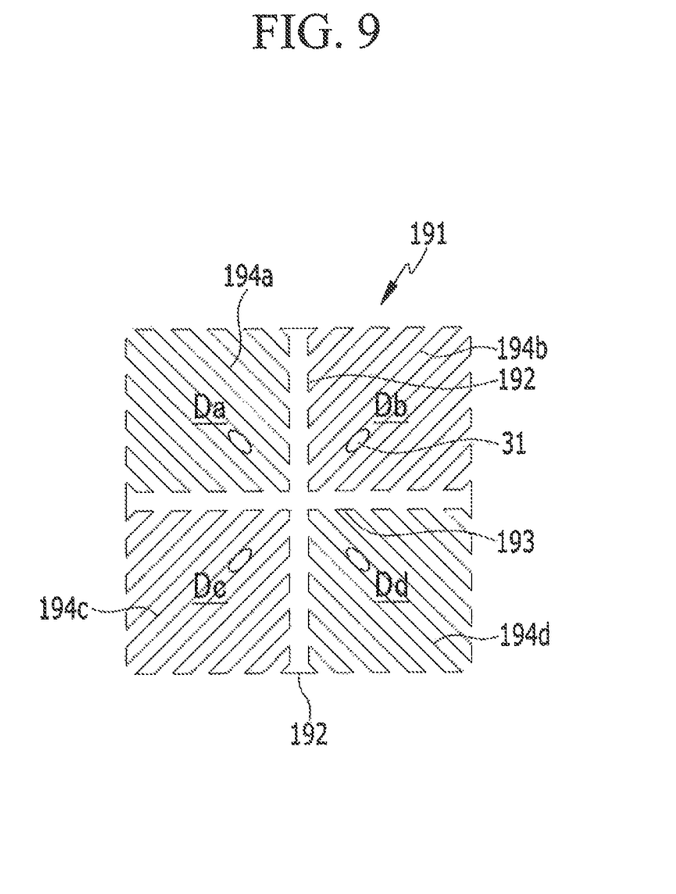
FIG. 9 is a top plan view of a region of a field generating electrode of a display device according to an exemplary embodiment of the present invention.

With reference to FIG. 9, an electrode of a display device according to an exemplary embodiment of the present invention will be described. FIG. 9 is a top plan view of a region of a field generating electrode of a display device according to an exemplary embodiment of the present invention.

Referring to FIG. 9, an overall shape of the electrode 191 is a quadrangle and includes a cross stem portion including a horizontal stem portion 193 and a vertical stem portion 192 perpendicular thereto. In addition, the electrode 191 is divided into a first subregion Da, a second subregion Db, a third subregion Dc, and a fourth subregion Dd by the horizontal stem portion 193 and the vertical stem portion 192 and each of the subregions Da to Dd includes a plurality of first to fourth fine branch portions 194a, 194b, 194c, and 194d.

The first fine branch portion 194a diagonally extends in a left-upward direction from the horizontal stem portion 193 or the vertical stem portion 192, and the second fine branch portion 194b diagonally extends in a right-upward direction from the horizontal stem portion 193 or the vertical stem portion 192. In addition, the third fine branch portion 194c diagonally extends in a left-downward direction from the horizontal stem portion 193 or the vertical stem portion 192, and the fourth fine branch portion 194d diagonally extends in a right-downward direction from the horizontal stem portion 193 or the vertical stem portion 192.

The first to fourth fine branch portions 194a, 194b, 194c, and 194d make an angle of about 40 or 50 degrees with respect to the gate line 121 or the horizontal stem portion 193. In addition, the fine branch portions 194a, 194b, 194c, and 194d of two neighboring subregions of the subregions Da, Db, Dc, and Dd may be perpendicular to each other.

When an electric field is applied to the liquid crystal layer 3, sides of the first to fourth fine branch portions 194a, 194b, 194c, and 194d form a fringe field. Accordingly, the liquid crystal molecules 31 are inclined in parallel to a length direction of the fine branch portions 194a, 194b, 194c, and 194d.

The electrode 191 includes four subregions Da to Dd including the fine branch portions 194a, 194b, 194c, and 194d with different length directions, and thus inclination directions of the liquid crystal molecules 31 number four, and four domains with different alignment directions of the liquid crystal molecules 31 are formed on the liquid crystal layer 3. As such, when inclination directions of liquid crystal molecules are different, a reference viewing angle of a display device is increased.

According to an exemplary embodiment of the present invention, third subpixel electrodes that overlap white filters of a first color pixel area, a second color pixel area, and a third color pixel area may be connected to each other and a second subpixel electrode and a third subpixel electrode of a third color pixel area may be connected to simplify a driving circuit for a white pixel.

According to an exemplary embodiment of the present invention, a pixel area may include a first subpixel area and a second subpixel area and a second subpixel area may include a region for displaying white to simplify a driving circuit and to reduce manufacturing costs compared with the case in which a separate white pixel is formed.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A liquid crystal display including a first color pixel area, a second color pixel area, and a third color pixel area, each of which includes a first subpixel area and a second subpixel area, the liquid crystal display comprising:
   a first substrate and a second substrate that face each other;
   first, second, and third color filters positioned on the first substrate or the second substrate, the first color filter disposed in the first subpixel area of the first color pixel area, the second color filter disposed in the first subpixel area of the second color pixel area, and the third color filter disposed in the first subpixel area of the third color pixel area;
   first to third white filters positioned on the first substrate or the second substrate, another first color filter and the first white filter disposed in the second subpixel area of the first color pixel area, another second color filter and the second white filter disposed in the second subpixel area of the second color pixel area, and another third color filter and the third white filter disposed in the second subpixel area of the third color pixel area; and
   a liquid crystal layer positioned between the first substrate and the second substrate,
   wherein the first to third white filters surround the first color filter, the second color filter, and the third color filter in the second subpixel area.

2. The liquid crystal display of claim 1, further comprising:
   a pixel electrode positioned on the first substrate,
   wherein the pixel electrode includes:
   a first subpixel electrode positioned in the first subpixel area; and
   a second subpixel electrode and a third subpixel electrode positioned in the second subpixel area.

3. The liquid crystal display of claim 2, wherein:
   the second subpixel electrode overlaps the first color filter, the second color filter, and the third color filter in the second subpixel area; and
   the third subpixel electrode overlaps the first to third white filters.

4. The liquid crystal display of claim 3, wherein:
   the second subpixel electrode and the third subpixel electrode of the first color pixel area and the second color pixel area are separated from each other; and
   the second subpixel electrode and the third subpixel electrode of the third color pixel area are connected to each other.

5. The liquid crystal display of claim 4, wherein:
   the third subpixel electrode surrounds the third second subpixel electrode in the first, second and third color pixel areas.

6. The liquid crystal display of claim 5, wherein:
   the third subpixel electrode of the first color pixel area, the third subpixel electrode of the second color pixel area, and the third subpixel electrode of the third color pixel area are connected to each other.

7. The liquid crystal display of claim 6, further comprising a first connection portion for connecting the third subpixel electrode of the first color pixel area to the third subpixel electrode of the second color pixel area.

8. The liquid crystal display of claim 6, further comprising:
   a second connection portion for connecting the third subpixel electrode of the second color pixel area to the third subpixel electrode of the third color pixel area.

9. The liquid crystal display of claim 6, wherein:
   different data voltages are applied to the first subpixel electrode and the second subpixel electrode.

10. The liquid crystal display of claim 6, wherein:
    the same data voltage is applied to the third subpixel electrode of the first color pixel area, the third subpixel electrode of the second color pixel area, and the third subpixel electrode of the third color pixel area.

11. The liquid crystal display of claim 1, wherein:
    the first color is red, the second color is green, and the third color is blue.

12. The liquid crystal display of claim 2, wherein:
    the first subpixel electrode and the second subpixel electrode include a cross stem portion including a horizontal stem portion and a vertical stem portion that cross each other; and
    a plurality of branch portions that extend in a diagonal direction from the cross stem portion.

13. The liquid crystal display of claim 12, wherein:
    each of the first subpixel electrode and the second subpixel electrode includes four domains separated by the cross stem portion.

14. The liquid crystal display of claim 13, wherein:
    the third subpixel electrode surrounds the second subpixel electrode and overlaps the four domains.

15. The liquid crystal display of claim 14, wherein:
    the third subpixel electrode includes a plurality of branch portions.

16. The liquid crystal display of claim 15, wherein:
    the plurality of branch portions of the first, second or third subpixel electrodes make an angle of 40 to 50 degrees with respect to the horizontal stem portion.

17. A liquid crystal display, comprising:
a first substrate and a second substrate facing the first substrate;
a liquid crystal layer disposed between the first substrate and the second substrate;
first subpixel electrodes disposed in first subpixel areas of first, second and third color pixel areas; and
second and third subpixel electrodes disposed in second subpixel areas of the first, second and third color pixel areas,
wherein the first subpixel area of a first color pixel area includes a first color filter, the first subpixel area of a second color pixel area includes a second color filter, and the first subpixel area of a third color pixel area includes a third color filter,
wherein the second subpixel area of the first color pixel area includes a first color filter and a white filter, the second subpixel area of the second color pixel area includes a second color filter and a white filter, and the second subpixel area of the third color pixel area includes a third color filter and a white filter,
wherein the second and third subpixel electrodes are separated from each other in the first color pixel area, the second and third subpixel electrodes are separated from each other in the second color pixel area and the second and third subpixel electrodes are connected to each other in the third color pixel area.

18. The liquid crystal display of claim 17, wherein the white filter is disposed on opposite sides of the first color filter in the second subpixel area of the first color pixel area, the white filter is disposed on opposite sides of the second color filter in the second subpixel area of the second color pixel area and the white filter is disposed on opposite sides of the third color filter in the second subpixel area of the third color pixel area.

19. The liquid crystal display of claim 17, wherein the first color is red, the second color is green, and the third color is blue.

20. A liquid crystal display, comprising:
a first substrate and a second substrate facing the first substrate;
a liquid crystal layer disposed between the first substrate and the second substrate;
first subpixel electrodes disposed in first subpixel areas of first, second and third color pixel areas; and
second and third subpixel electrodes disposed in second subpixel areas of the first, second and third color pixel areas,
wherein the first subpixel area of a first color pixel area includes a first color filter, the first subpixel area of a second color pixel area includes a second color filter, and the first subpixel area of a third color pixel area includes a third color filter,
wherein the second subpixel area of the first color pixel area includes a first color filter and a white filter, the second subpixel area of the second color pixel area includes a second color filter and a white filter, and the second subpixel area of the third color pixel area includes a third color filter and a white filter,
wherein the second subpixel electrode of the first color pixel area is connected to a first data line via a first transistor, the second subpixel electrode of the second color pixel area is connected to a second data line via a second transistor and the third subpixel electrode of the third color pixel area is connected to a third data line via a third transistor.

\* \* \* \* \*